United States Patent
Yang et al.

(10) Patent No.: US 7,704,920 B2
(45) Date of Patent: *Apr. 27, 2010

(54) POLLUTANT EMISSION CONTROL SORBENTS AND METHODS OF MANUFACTURE

(75) Inventors: Xiaolin David Yang, Edison, NJ (US); Pascaline Harrison Tran, Holmdel, NJ (US); Lawrence Shore, Edison, NJ (US); Barry Keven Speronello, Belle Meade, NJ (US); Ronald Thomas Mentz, Erie, PA (US)

(73) Assignee: BASF Catalysts LLC, Florham Park, NJ (US)

( * ) Notice: Subject to any disclaimer, the term of this patent is extended or adjusted under 35 U.S.C. 154(b) by 1161 days.

This patent is subject to a terminal disclaimer.

(21) Appl. No.: 11/290,631

(22) Filed: Nov. 30, 2005

(65) Prior Publication Data
US 2007/0122327 A1    May 31, 2007

(51) Int. Cl.
*B01J 20/02* (2006.01)
*B01J 20/06* (2006.01)
*B01J 20/16* (2006.01)
*B01J 20/10* (2006.01)
*B01D 53/64* (2006.01)

(52) U.S. Cl. .............. 502/400; 502/407; 502/415; 423/210

(58) Field of Classification Search ........... 502/400, 502/407, 415; 423/210
See application file for complete search history.

(56) References Cited

U.S. PATENT DOCUMENTS

| 4,094,777 A | 6/1978 | Sugier et al. |
|---|---|---|
| 4,361,493 A | 11/1982 | Kiefer |
| 4,708,853 A | 11/1987 | Matviya et al. |
| 5,245,106 A | 9/1993 | Cameron et al. |
| 5,306,474 A | 4/1994 | Kida et al. |
| 5,405,593 A | 4/1995 | Knudson |
| 5,409,522 A | 4/1995 | Durham et al. |
| 5,505,766 A | 4/1996 | Chang |
| 5,569,436 A | 10/1996 | Lerner |
| 5,607,496 A | 3/1997 | Brooks |
| 5,618,508 A | 4/1997 | Suchenwirth et al. |
| 5,695,726 A | 12/1997 | Lerner |
| 5,787,823 A | 8/1998 | Knowles |

(Continued)

FOREIGN PATENT DOCUMENTS

EP          0043759 A1    1/1982

(Continued)

OTHER PUBLICATIONS

PCT/US2006/044711—PCT International Search Report, 3 pgs.

(Continued)

*Primary Examiner*—Timothy C Vanoy
*Assistant Examiner*—Daniel Berns
(74) *Attorney, Agent, or Firm*—Scott S. Servilla; Diehl Servilla LLC; Melanie L. Brown

(57) ABSTRACT

Sorbents for removal of mercury and other pollutants from gas streams, such as a flue gas stream from coal-fired utility plants, and methods for their manufacture and use are disclosed. The methods include mixing sorbent substrate particles with a sulfide salt and a metal salt to form a metal sulfide on the outer surface of the sorbent particles.

20 Claims, 2 Drawing Sheets

Mercury Removal Versus Loading Level of Cu

U.S. PATENT DOCUMENTS

| | | |
|---|---|---|
| 5,827,352 A | 10/1998 | Altman et al. |
| 5,854,173 A | 12/1998 | Chang et al. |
| 5,868,829 A | 2/1999 | Biermann et al. |
| 5,897,688 A | 4/1999 | Voogt et al. |
| 5,948,143 A | 9/1999 | Sjostrom et al. |
| 6,027,551 A | 2/2000 | Hwang et al. |
| 6,132,801 A | 10/2000 | Linford |
| 6,136,072 A | 10/2000 | Sjostrom et al. |
| 6,375,909 B1 | 4/2002 | Dangtran et al. |
| 6,387,841 B1 | 5/2002 | Devlin et al. |
| 6,521,021 B1 | 2/2003 | Pennline et al. |
| 6,558,454 B1 | 5/2003 | Chang et al. |
| 6,638,485 B1 | 10/2003 | Iida et al. |
| 6,695,894 B2 | 2/2004 | Chang et al. |
| 6,712,878 B2 | 3/2004 | Chang et al. |
| 6,719,828 B1 | 4/2004 | Lovell et al. |
| 6,770,250 B2 | 8/2004 | Cooper et al. |
| 6,818,043 B1 | 11/2004 | Chang et al. |
| 7,048,781 B1 | 5/2006 | Lovell |
| 7,288,499 B1 | 10/2007 | Lovell et al. |
| 2002/0018853 A1 | 2/2002 | Khare |
| 2003/0103882 A1 | 6/2003 | Biermann et al. |
| 2003/0104937 A1 | 6/2003 | Sinha |
| 2003/0118493 A1 | 6/2003 | Cooper et al. |
| 2003/0176396 A1 | 9/2003 | Shea et al. |
| 2003/0206843 A1 | 11/2003 | Nelson |
| 2004/0003716 A1 | 1/2004 | Nelson |
| 2004/0081606 A1 | 4/2004 | Cooper et al. |
| 2004/0202596 A1 | 10/2004 | Honjo et al. |
| 2005/0103243 A1 | 5/2005 | Lissianski et al. |
| 2007/0122327 A1 | 5/2007 | Yang et al. |
| 2007/0122619 A1 * | 5/2007 | Yang et al. .................. 428/403 |

FOREIGN PATENT DOCUMENTS

| | | |
|---|---|---|
| EP | 0145539 | 6/1985 |
| EP | 0271618 | 6/1988 |
| EP | 0480603 A2 | 4/1992 |
| EP | 480603 A2 | 4/1992 |
| EP | 0484234 A2 | 5/1992 |
| EP | 0930091 | 7/1999 |
| WO | WO0172395 | 10/2001 |
| WO | WO0185307 | 11/2001 |

OTHER PUBLICATIONS

PCT International Search Report PCT/US2006/044711 mailed Jul. 5, 2007.

Non-Final Office Action of Aug. 5, 2008—U.S. Appl. No. 11/290,630, 16 pp.

Non Final Office Action of Oct. 28, 2008—U.S. Appl. No. 11/291,091, 24 pp.

"Control of Mercury Emissions From Coal-Fired Electric Utility Boilers", *EPA Report, EPA-600/R-01-109*, (Apr. 2002).

Final Office Action in U.S. Appl. No. 11/290,630, dated Jan. 21, 2009, 8 pp.

Final Office Action in U.S. Appl. No. 11/291,091, dated Feb. 9, 2009, 12 pp.

* cited by examiner

POLLUTANT EMISSION CONTROL SORBENTS AND METHODS OF MANUFACTURE

TECHNICAL FIELD

Embodiments of the invention relate to sorbents for the removal of pollutants such as mercury from gas streams, methods for manufacturing sorbents and the use of sorbents in pollution control.

BACKGROUND ART

Emission of pollutants, for example, mercury, from sources such as coal-fired and oil-fired boilers has become a major environmental concern. Mercury (Hg) is a potent neurotoxin that can affect human health at very low concentrations. The largest source of mercury emission in the United States is coal-fired electric power plants. Coal-fired power plants account for between one-third and one-half of total mercury emissions in the United States. Mercury is found predominantly in the vapor-phase in coal-fired boiler flue gas. Mercury can also be bound to fly ash in the flue gas.

On Dec. 15, 2003, the Environmental Protection Agency (EPA) proposed standards for emissions of mercury from coal-fired electric power plants, under the authority of Sections 111 and 112 of the Clean Air Act. In their first phase, the standards could require a 29% reduction in emissions by 2008 or 2010, depending on the regulatory option chosen by the government. In addition to EPA's regulatory effort, in the United States Congress, numerous bills recently have been introduced to regulate these emissions. These regulatory and legislative initiatives to reduce mercury emissions indicate a need for improvements in mercury emission technology.

There are three basic forms of Hg in the flue gas from a coal-fired electric utility boiler: elemental Hg (referred to herein by the symbol $Hg^0$); compounds of oxidized Hg (referred to herein the symbol $Hg^{2+}$); and particle-bound mercury. Oxidized mercury compounds in the flue gas from a coal-fired electric utility boiler may include mercury chloride ($HgCl_2$), mercury oxide (HgO), and mercury sulfate ($HgSO_4$). Oxidized mercury compounds are sometimes referred to collectively as ionic mercury. This is because, while oxidized mercury compounds may not exist as mercuric ions in the boiler flue gas, these compounds are measured as ionic mercury by the speciation test method used to measure oxidized Hg. The term speciation is used to denote the relative amounts of these three forms of Hg in the flue gas of the boiler. High temperatures generated by combustion in a coal boiler furnace vaporize Hg in the coal. The resulting gaseous $Hg^0$ exiting the furnace combustion zone can undergo subsequent oxidation in the flue gas by several mechanisms. The predominant oxidized Hg species in boiler flue gases is believed to be $HgCl_2$. Other possible oxidized species may include HgO, $HgSO_4$, and mercuric nitrate monohydrate ($Hg(NO_3)_2 \cdot H_2O$).

Gaseous Hg (both $Hg^0$ and $Hg^{2+}$) can be adsorbed by the solid particles in boiler flue gas. Adsorption refers to the phenomenon where a vapor molecule in a gas stream contacts the surface of a solid particle and is held there by attractive forces between the vapor molecule and the solid. Solid particles are present in all coal-fired electric utility boiler flue gas as a result of the ash that is generated during combustion of the coal. Ash that exits the furnace with the flue gas is called fly ash. Other types of solid particles, called sorbents, may be introduced into the flue gas stream (e.g., lime, powdered activated carbon) for pollutant emission control. Both types of particles may adsorb gaseous Hg in the boiler flue gas.

Sorbents used to capture mercury and other pollutants in flue gas are characterized by their physical and chemical properties. The most common physical characterization is surface area. The interior of certain sorbent particles are highly porous. The surface area of sorbents may be determined using the Brunauer, Emmett, and Teller (BET) method of $N_2$ adsorption. Surface areas of currently used sorbents range from 5 $m^2$/g for Ca-based sorbents to over 2000 $m^2$/g for highly porous activated carbons. EPA Report, Control of Mercury Emissions From Coal-Fired Electric Utility Boilers, Interim Report, EPA-600/R-01-109, April 2002. For most sorbents, mercury capture often increases with increasing surface area of the sorbent.

Mercury and other pollutants can be captured and removed from a flue gas stream by injection of a sorbent into the exhaust stream with subsequent collection in a particulate matter control device such as an electrostatic precipitator or a fabric filter. Adsorptive capture of Hg from flue gas is a complex process that involves many variables. These variables include the temperature and composition of the flue gas, the concentration of Hg in the exhaust stream, and the physical and chemical characteristics of the sorbent. Of the known Hg sorbents, activated carbon and calcium-based sorbents have been the most actively studied.

Currently, the most commonly used method for mercury emission reduction is the injection of powdered activated carbon into the flue stream of coal-fired and oil-fired plants. Currently, there is no available control method that efficiently collects all mercury species present in the flue gas stream. Coal-fired combustion flue gas streams are of particular concern because their composition includes trace amounts of acid gases, including $SO_2$ and $SO_3$, NO and $NO_2$, and HCl. These acid gases have been shown to degrade the performance of activated carbon. Though powdered activated carbon is effective to capture oxidized mercury species such as $Hg^{+2}$, powdered activated carbon (PAC) is not as effective for elemental mercury which constitutes a major Hg species in flue gas, especially for subbituminous coals and lignite. There have been efforts to enhance the $Hg^0$ trapping efficiency of PAC by incorporating bromine species. This, however, not only introduces significantly higher cost, but a disadvantage to this approach is that bromine itself is a potential environmental hazard. Furthermore, the presence of PAC hinders the use of the fly ash in the cement industry and other applications due to its color and other properties.

As noted above, alternatives to PAC sorbents have been utilized to reduce mercury emissions from coal-fired boilers. Examples of sorbents that have been used for mercury removal include those disclosed in U.S. Patent Application Publication No. 2003/0103882 and in U.S. Pat. No. 6,719,828. In U.S. Patent Application Publication No. 2003/0103882, calcium carbonate and kaolin from paper mill waste sludge were calcined and used for Hg removal at high temperatures above 170° C., preferably 500° C. U.S. Pat. No. 6,719,828 teaches the preparation of layered sorbents such as clays with metal sulfide between the clay layers and methods for their preparation. The method used to prepare the layered sorbents is based on an ion exchange process, which limits the selection of substrates to only those having high ion exchange capacity. In addition, ion exchange is time-consuming and involves several wet process steps, which significantly impairs the reproducibility, performance, scalability, equipment requirements, and cost of the sorbent. For example, a sorbent made in accordance with the teachings of U.S. Pat. No. 6,719,828 involves swelling a clay in an acidified solution, introducing a metal salt solution to exchange metal ions between the layers of the clay, filtering the ion exchanged clay, re-dispersing the clay in solution, sulfidation of the clay by adding another sulfide solution, and finally the product is filtered and dried. Another shortcoming of the process disclosed in U.S. Pat. No. 6,719,828 is that the by-products of the ion exchange process, i.e., the waste solutions of metal ions and hydrogen sulfide generated from the acidic solution, are an environmental liability.

There is an ongoing need to provide improved pollution control sorbents and methods for their manufacture. It would be desirable to provide sorbents containing metal sulfides on the sorbent substrate that can be manufactured easily and inexpensively. In this regard, simple and environmentally friendly methods that effectively disperse metal sulfide on readily available substrates, which do not require the numerous steps involved in an ion exchange process are needed.

DISCLOSURE OF THE INVENTION

Aspects of the invention include compositions, methods of manufacture, and systems and methods for removal of heavy metals and other pollutants from gas streams. In particular, the compositions and systems are useful for, but not limited to, the removal of mercury from flue gas streams generated by the combustion of coal. One aspect of the present invention relates to a sorbent made by a method comprising mixing a metal salt with sorbent substrate particles by grinding or milling; mixing a sulfide salt with the sorbent substrate particles and the metal salt to form a metal sulfide on the outer surface of the particles; and drying the mixture. In one embodiment, the method optionally includes reducing the particle size of the particles. According to other aspects, sorbents are provided comprising particles containing a metal sulfide formed on the outer surface of the particles by a dry mixing process without the use of an ion exchange process, the sorbent being adapted for removal of mercury from a gas stream. Another aspect of the invention pertains to sorbents that include halogen anions on the sorbent, which significantly promotes Hg-capture.

BEST MODE FOR CARRYING OUT THE INVENTION

Figure 1:
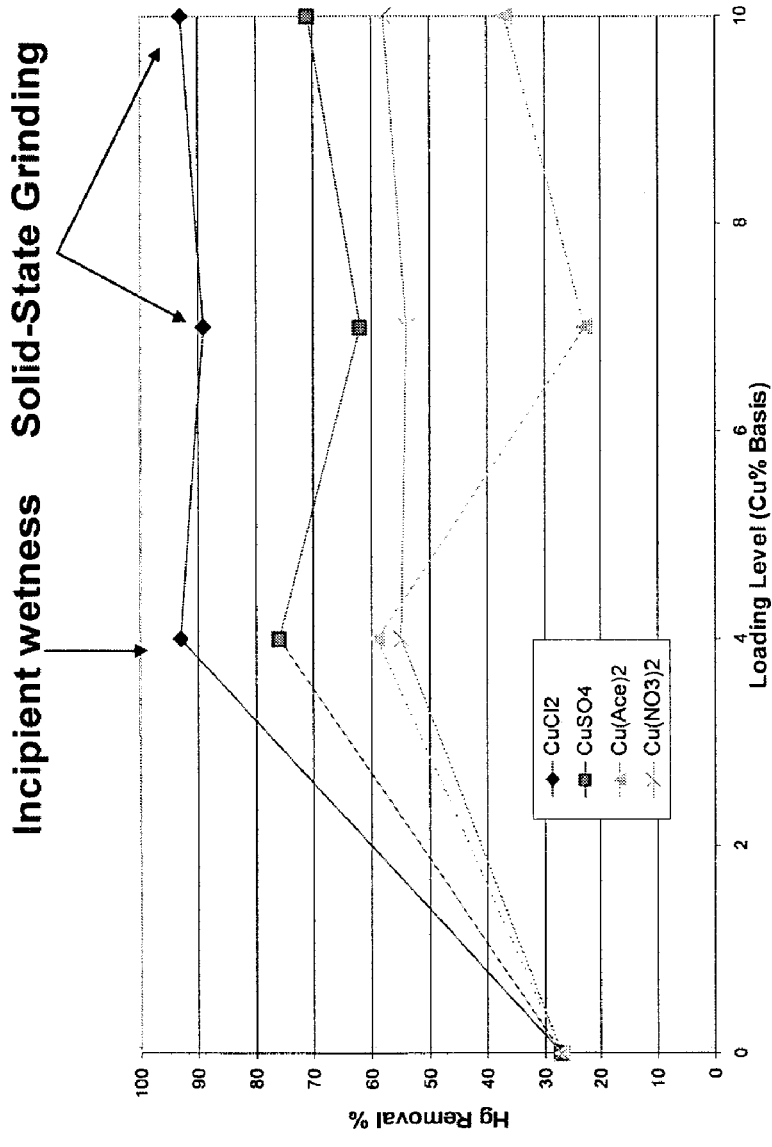
FIG. 1 is graph showing mercury removal versus copper loading on a copper weight percent basis.

Before describing several exemplary embodiments of the invention, it is to be understood that the invention is not limited to the details of construction or process steps set forth in the following description. The invention is capable of other embodiments and of being practiced or being carried out in various ways.

Aspects of the invention provide improved sorbents, which may be used to remove mercury and other pollutants from the flue gases of coal-fired and oil-fired boilers, methods for manufacturing such sorbents, and systems and methods utilizing these sorbents.

Applicants have determined that an ion exchange process, such as the type disclosed in U.S. Pat. No. 6,719,828, is not necessary for mercury capture by the sorbent material. Accordingly, a wide variety of substrates, regardless of their porosity, purity, or ion exchange capacity, can be manufactured and used for mercury removal in accordance with the present invention. As used herein, the term substrate refers to the material onto which the pollutant is adsorbed in a pollution removal system. Typically substrates are in the form of particles, but the substrates may be embodied in other forms. Mercury removal data shown below in the Examples show that non-porous clays with little ion exchange capacity, such as kaolin, metakaolin, and even common dirt, provide comparable, or in some instances, better mercury removal efficiency than bentonite.

According to one or more embodiments, incipient wetness or solid-state reactive grinding processes are used to disperse metal sulfide salts on the surface of sorbent particles. The incipient wetness or solid-state reactive grinding methods disclosed herein do not require excessive liquids associated with wet processes, thus eliminating problems associated with wet processes. These problems may include disposal of solutions containing waste of metal ions or hydrogen sulfide. In addition, certain embodiments of the present invention provide accurate control of the amount of metal sulfide on the surface of the sorbent. Further, the processes according to certain embodiments are much faster and significantly reduce the equipment and resources required for the large-scale production. Moreover, the highly dispersed metal sulfide on the surface of the sorbent provides better contact between Hg and metal sulfide when used for mercury removal, as evidenced by the higher and faster mercury capture than those obtained by the ion exchange process when measured by an in-flight test with simulated flue gases.

Another embodiment of the invention pertains to the addition of at least one halogen-containing salt to the sorbent. The presence of chloride significantly promotes the Hg-capture, possibly due to the formation of mercury chloride complexes.

According to one embodiment of the invention, the steps for making surface-dispersed metal sulfide include: mixing a metal salt with a substrate particle by grinding or milling; adding and mixing, preferably by grinding, a sulfide salt with the metal salt and substrate particle mixture; and drying the mixture. In certain embodiments, the resultant material is optionally milled to the desired particle size. For low metal sulfide loading, the sulfide can be added by incipient wetness as described below. For high metal sulfide loading, the sulfide can be added by solid-state grinding.

While embodiments of the present invention should not be limited by a particular theory of operation or scientific principle, it is believed that the metal salt (e.g., $CuCl_2$) reacts with sulfide (e.g., $Na_2S$) in situ to form a metal sulfide (for example, CuS) on the surface of the substrate particles (for example, kaolin clay). The formation of the metal sulfide can occur either by contact via incipient wetness of the reaction or said solid-state reactive grinding. Since most metal salts and sulfides are crystal hydrates, for high metal sulfide loading, the water released from the chemicals during mixing is sufficient to moisten the mixture. As an example, the following reaction,

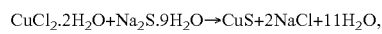
$$CuCl_2.2H_2O+Na_2S.9H_2O \rightarrow CuS+2NaCl+11H_2O,$$

demonstrates that no additional water is required to disperse CuS in the mixture.

Suitable substrate sorbent materials in accordance with embodiments of the present invention include any inorganic or organic materials that are stable under the flue gas conditions (temperature, pressure, gas components, residence time, etc). Suitable sorbents include, but are not limited to, commonly used oxides such as alumina, silica, titania, zirconia, iron oxides, zinc oxide, rare earth oxides, metal carbonate, metal sulfate, aluminosilicates, zeolites, activated carbon, kaolin, metakaolin, fully calcined kaolin, talc, coal, etc. A sorbent can be prepared in accordance with embodiments of the invention regardless of the porosity of the material, ion exchange capacity, origin (synthetic or natural), or purity. As demonstrated below, common dirt can be used in accordance with embodiments of the invention. Presently preferred substrates are natural, low cost clays such as kaolin and common dirt.

The metal salts used according to method embodiments include any metal salt that can release a metal ion with any oxidation states when the salt contacts a sulfide salt and thereafter forms water insoluble metal sulfide on the surface of a substrate. The metal includes alkaline earth metals and the metals that have an atomic number of between 21 and 30, between 38 and 50, and between 56 and 79, and combinations thereof. Examples of metal include copper, titanium, tin, iron, and manganese. A presently preferred metal ion is $Cu^{+2}$ and presently preferred salts are nitrate, chloride, sulfate, and acetate, and combinations thereof. The loading level of metal is between about 0 and 100 weight percent, preferably between about 1 and 50 weight percent, and most preferably between about 1 and 20 weight percent.

Any sulfide precursor that forms the $S^{-2}$ anion can be used in accordance with embodiments of the invention. This includes, but is not limited to, $Na_2S$ and $(NH_4)_2S$. $Na_2S$ is a presently preferred sulfide precursor. Sulfide loading level can be stoichiometric (1:1 atomic ratio) or different than that of the metal ion.

Dispersion of the metal sulfide can be accomplished by any method as long as the metal sulfide is well dispersed on the surface of the substrate. Such methods include, but are not limited to, incipient wetness, solid-state mixing, spray-drying, sprinkling of solution on the solid, precipitation, co-precipitation, etc. Presently preferred methods are solid-state reactive grinding for high metal sulfide loading, incipient wetness for low metal sulfide loading, or a combination of grinding and incipient wetness. The order of adding the metal salts and sulfide salts can be altered, e.g., the sulfide salt can be added to the substrate first followed by addition of the metal salt. The metal sulfide can be added to the substrate one salt at a time (e.g., add $CuCl_2$ first, followed by adding $Na_2S$), two salts at the same time (e.g., co-precipitation), or directly mixing fine metal sulfide powder with the substrate.

Additional steps according to embodiments of the invention may include drying and milling the sorbent. Drying may be accomplished by any means such as static, spray-drying, microwave drying, or on a moving belt at a temperature between about 25° and 200° C. for 0 to 15 hours, preferably between about 60° and 150° C., most preferably between about 90° and 140° C. The sorbent can optionally be milled to an average particle size below about 80 μm, preferably below about 40 μm.

Without intending to limit the invention in any manner, the present invention will be more fully described by the following examples.

EXAMPLES

Several samples were prepared in accordance with the methods for manufacturing sorbent substrates described above. Table 1 lists the sample number, the sulfide salt formed on the surface of the sorbent (D), the sorbent substrate (A), the metal salt (B), and the precursor sulfide salt (C). The last column of Table 1 indicates the order of mixing of each of the ingredients. For example, A-B-C indicates that the metal salt (B) was added to the substrate (A) first, and then precursor sulfide salt (C) was added to the mixture.

For example, sample number 53 was prepared by mixing 3.9 g of $SnCl_2 \cdot 2H_2O$ with 5.0 g of metakaolin clay by a thorough solid-state grinding. Next, 1.35 g of $Na_2S \cdot 9H_2O$ was dissolved in de-ionized water and added to the solid mixture by what is termed herein as the incipient wetness process, in which the solution was added drop-wise to the solid mixture which was stirred rigorously. The resultant moistened solid was wet enough to completely disperse CuS on the clay, but dry enough so that the paste did not flow. The moistened paste was then dried at 105° C. in air overnight and milled to a particle size of $D_{90} < 40$ μm.

For sample 54, 3.9 g of $SnCl_2 \cdot 2H_2O$ was mixed with 5.0 g of metakaolin clay by a thorough solid-state grinding. Then, 1.35 g of $Na_2S \cdot 9H_2O$ powder was added in by another thorough solid-state grinding. The moistened paste was then dried at 105° C. in air overnight and milled to a particle size of $D_{90} < 40$ μm.

The remaining samples were prepared in a very similar way as the above two samples. The source and purity of the raw chemicals are listed in Table 2, and the main characteristic properties of the sorbent substrates are listed in Table 3.

Table 1: Summary of the Hg-Removal Sorbent Composition and Preparation Methods

| Example | Metal Sulfide (D) | Substrate (A) | Metal Salt (B) | Precursor Sulfide (C) | Prep. |
|---|---|---|---|---|---|
| ECS01 | CuS (10% Cu basis) | 10 g Na-bentonite | 2.95 g $CuCl_2 \cdot 2H_2O$ solid-state grinding | 4.16 g $Na_2S \cdot 9H_2O$ solid-state grinding | A-B-C |
| ECS02 | CuS (10% Cu basis) | 10 g Na-bentonite | 4.32 g $CuSO_4 \cdot 5H_2O$ solid-state grinding | 4.16 g $Na_2S \cdot 9H_2O$ solid-state grinding | A-B-C |
| ECS03 | CuS (20% Cu basis) | 10 g Na-bentonite | 5.9 g $CuCl_2 \cdot 2H_2O$ solid-state grinding | 8.33 g $Na_2S \cdot 9H_2O$ solid-state grinding | A-B-C |
| ECS04 | $Fe_2S_3$ (6% Fe basis) | 10 g Na-bentonite | 3.12 g $FeCl_3 \cdot 6H_2O$. solid-state grinding | 16 g $Na_2S \cdot 9H_2O$ solid-state grinding | A-B-C |
| ECS05 | CuS (10% Cu basis) | 10 g metakaolin | 2.95 g $CuCl_2 \cdot 2H_2O$ solid-state grinding | 4.16 g $Na_2S \cdot 9H_2O$ solid-state grinding | A-B-C |
| ECS06 | CuS (20% Cu basis) + $CuCl_2$ | 10 g Na-bentonite | 5.9 g $CuCl_2 \cdot 2H_2O$ solid-state grinding | 2.70 g $Na_2S \cdot 9H_2O$ solid-state grinding | A-B-C |
| ECS07 | CuS (10% Cu basis) + sulfur powder | 10 g Na bentonite | 2.95 g $CuCl2 \cdot 2H2O$ solid state grinding heated to 150° C. for 0.5 hr | 0.56 g sulfur powder | A-B-C |
| ECS08 | MnS (4% Mn basis) | 10 g Na-bentonite | 1.71 g $MnCl_2 \cdot 4H_2O$ solid-state grinding | 4.16 g $Na_2S \cdot 9H_2O$ solid-state grinding | A-B-C |
| ECS09 | S(10% S basis) | 10 g Na-bentonite | 0 | 1.11 g sulfur powder | A-B |

-continued

| Example | Metal Sulfide (D) | Substrate (A) | Metal Salt (B) | Precursor Sulfide (C) | Prep. |
|---|---|---|---|---|---|
| ECS10 | none | 10 g Na-bentonite | 0 | 0 | A |
| ECS11 | $MnS_2$ (3% Mn basis) | 10 g Na-bentonite | 1.37 g $KMnO_4$ solid-state grinding | 8.33 g $Na_2S \cdot 9H_2O$ solid-state grinding | A-B-C |
| ECS12 | $KMnO_4$ (4% Mn basis) | | 10 g Na-bentonite solid-state grinding | 1.37 g $KMnO_4$ solid-state grinding | A-B |
| ECS13 | $AgNO_3$ (1% Ag basis) | 10 g Na-bentonite | 0.159 g $AgNO_3$ | 0 | A-B |
| ECS14 | CuS (10% Cu basis) | 10 g metakaolin | 2.95 g $CuCl_2 \cdot 2H_2O$ incipient wetness | 4.16 g $Na_2S \cdot 9H_2O$ solid-state grinding | A-C-B |
| ECS15 | CuS (20% Cu basis) | 10 g Na-bentonite | 1.48 g $CuCl_2 \cdot 2H_2O$ solid-state grinding | 2.08 g $Na_2S \cdot 9H_2O$ solid-state grinding | A-B-C |
| ECS16 | CuS (20% Cu basis) | 10 g metakaolin | 5.90 g $CuCl_2 \cdot 2H_2O$ solid-state grinding | 8.33 g $Na_2S \cdot 9H_2O$ solid-state grinding | A-B-C |
| ECS17 | CuS (15% Cu basis) | 10 g metakaolin | 4.43 g $CuCl_2 \cdot 2H_2O$ solid-state grinding | 6.25 g $Na_2S \cdot 9H_2O$ solid-state grinding | A-B-C |
| ECS18 | CuS (10% Cu basis) | 10 g kaolinite | 2.95 g $CuCl_2 \cdot 2H_2O$ solid-state grinding | 4.17 g $Na_2S \cdot 9H_2O$ solid-state grinding | A-B-C |
| ECS19 | CuS (10.0% Cu basis) | 10 g dirt | 2.950 g $CuCl_2 \cdot 2H_2O$ solid-state grinding | 4.17 g $Na_2S \cdot 9H_2O$ solid-state grinding | A-B-C |
| ECS20 | CuS (15% basis) | 10 g bentonite | 4.43 g $CuCl_2 \cdot 2H_2O$ solid-state grinding | 6.25 g $Na_2S \cdot 9H_2O$ solid-state grinding | A-B-C |
| ECS21 | CuS (10% Cu basis) | 20 g bentonite | .90 g $CuCl_2 2H_2O$ solid-state grinding | 8.33 g $Na_2S \cdot 9H_2O$ solid-state grinding (food processor blending) | A-B-C |
| ECS22 | CuS (4% Cu basis) | 10 g bentonite | 1.18 g $CuCl_2 \cdot 2H_2O$ solid-state grinding | 1.67 g $Na_2S \cdot 9H_2O$ incipient wetness | A-B-C |
| ECS23 | CuS (4% Cu basis) | 10 g bentonite | 1.72 g $CuSO_4 \cdot 5H_2O$ solid-state grinding | 1.67 g $Na_2S \cdot 9H_2O$ incipient wetness | A-B-C |
| ECS24 | CuS (7% Cu basis) | 10 g bentonite | 2.44 g $CuCl_2 \cdot 2H_2O$ solid-state grinding | 2.91 g $Na_2S \cdot 9H_2O$ solid-state grinding | A-B-C |
| ECS25 | CuS (7% Cu basis) | 10 g bentonite | 3.01 g $CuSO_4 \cdot 5H_2O$ solid-state grinding | 2.91 g $Na_2S \cdot 9H_2O$ solid-state grinding | A-B-C |
| ECS26 | Cu-s (10% Cu basis) | 20 g bentonite | 5.9 g $CuCl_2 \cdot 2H_2O$ Solid-state grinding | 8.33 g $Na_2S \cdot 9H_2O$ blending by blender | A-B-C |
| ECS27 | CuS (10% Cu basis) + $MgCl_2$ | 10 g bentonite | 4.32 g $CuSO_4 \cdot 5H_2O$ + 1.00 g $MgCl_2$ solid-state grinding | 4.161 g $Na_2S \cdot 9H_2O$ solid-state grinding | A-B-C |
| ECS28 | CuS (10% Cu basis) + $MgCl_2$ | 10 g bentonite | 4.32 g $CuSO_4 \cdot 5H_2O$ + 2.00 g $MgCl_2$ solid-state grinding | 4.16 g $Na_2S \cdot 9H_2O$ solid-state grinding | A-B-C |
| ECS29 | CuS (10% Cu basis) + $MgCl_2$ | 10 g bentonite | 4.32 g $CuSO_4 \cdot 5H_2O$ + 5.00 g $MgCl_2$ solid-state grinding | 4.16 g $Na_2S \cdot 9H_2O$ solid-state grinding | A-B-C |
| ECS30 | CuS (10% Cu basis) | 10 g bentonite | 2.16 g $CuSO_4 \cdot 5H_2O$ + 1.48 g $CCl_2 \cdot 2H_2O$ solid-state grinding | 4.16 g $Na_2S \cdot 9H_2O$ solid-state grinding | A-B-C |
| ECS31 | CuS (10% Cu basis) | 10 g bentonite | 3.24 g $CuSO_4 \cdot 5H_2O$ + 1.48 g $CCl_2 \cdot 2H_2O$ solid-state grinding | 0.74 g $Na_2S \cdot 9H_2O$ solid-state grinding | A-B-C |
| ECS32 | CuS (10% Cu basis) | 10 g bentonite | 3.45 g $Cu(acetate)2 \cdot H_2O_4$. solid-state grinding | 16 g $Na_2S \cdot 9H_2O$ solid-state grinding | A-B-C |
| ECS33 | CuS (7% Cu basis) | 10 g bentonite | 2.42 g $Cu(acetate)_2 \cdot H_2O$ solid-state grinding | 2.91 g $Na_2S \cdot 9H_2O$ solid-state grinding | A-B-C |
| ECS34 | CuS (4% Cu basis) | 10 g bentonite | 1.38 g $Cu(acetate)_2 \cdot H_2O$ solid-state grinding | 1.66 g $Na_2S \cdot 9H_2O$ incipient wetness | A-B-C |
| ECS35 | CuS (10% Cu basis) | 10 g bentonise | 4.02 g $Cu(NO_3)_2 \cdot 5/2H_2O$ solid-state grinding | 16 g $Na_2S \cdot 9H_2O$ solid-state grinding | A-B-C |
| ECS36 | CuS (7% Cu basis) | 10 g bentonite | 2.82 g $Cu(NO_3)_2 \cdot 5/2H_2O$ solid-state grinding | 2.91 g $Na_2S \cdot 9H_2O$ solid-state grinding | A-B-C |
| ECS37 | CuS (4% Cu basis) | 10 g bentonite | 1.61 g $Cu(NO_3)_2 \cdot 5/2H_2O$ solid-state grinding | 1.66 g $Na_2S \cdot 9H_2O$ incipient wetness | A-B-C |
| ECS38 | CuS (10% Cu basis) | 5 g bentonite | 0.83 g CuS solid-state mixing | / | A-B |
| ECS39 | CuS (20% CU basis) | 5 g bentonite | 1.66 g CuS solid-state mixing | / | A-B |
| ECS40 | CuS (1% Cu basis) | 10 g Bentonite | 0.295 g $CuCl_2 \cdot 2H_2O$ incipient wetness | 0.416 g $Na_2S \cdot 9H_2O$ solid-state grinding | A-C-B |
| ECS41 | CuS (2% Cu basis) | 10 g Bentonite | 0.59 $CuCl_2 \cdot 2H_2O$ incipient wetness | 0.832 g $Na_2S \cdot 9H_2O$ solid-state grinding | A-C-B |
| ECS42 | CuS (3% Cu basis) | 10 g Bentonite | 0.885 g $CuCl_2 \cdot 2H_2O$ incipient wetness | 1.248 g $Na_2S \cdot 9H_2O$ solid-state grinding | A-C-B |
| ECS43 | CuS (1% Cu basis) | 10 g Bentonite | 0.433 g $CuSO_4 \cdot 5H_2O$ incipient wetness | 0.416 g $Na_2S \cdot 9H_2O$ solid-state grinding | A-C-B |
| ECS44 | CuS (2% Cu basis) | 10 g Bentonite | 0.866 g $CuSO_4 \cdot 5H_2O$ incipient wetness | 0.833 g $Na_2S \cdot 9H_2O$ solid-state grinding | A-C-B |
| ECS45 | CuS (3% Cu basis) | 10 g Bentonite | 1.299 g $CuSO_4 \cdot 5H_2O$ incipient wetness | 1.248 g $Na_2S \cdot 9H_2O$ solid-state grinding | A-C-B |

-continued

| Example | Metal Sulfide (D) | Substrate (A) | Metal Salt (B) | Precursor Sulfide (C) | Prep. |
|---|---|---|---|---|---|
| ECS46 | CuS(4% Cu basis) + $MgCl_2$ | 10 g Bentonite | 1.732 g $CuSO_4 \cdot 5H_2O$<br>0.100 g $MgCl_2$<br>solid-state grinding | 1.664 g $Na_2S \cdot 9H_2O$<br>incipient wetness | A-B-C |
| ECS47 | CuS(3% Cu basis) + $MgCl_2$ | 10 g Bentonite | 1.299 g $CuSO_4 \cdot 5H_2O$<br>0.100 g $MgCl_2$<br>solid-state grinding | 1.248 g $Na_2S \cdot 9H_2O$<br>incipient wetness | A-B-C |
| ECS48 | CuS(3% Cu basis) + $MgCl_2$ | 10 g Bentonite | 1.299 g $CuSO_4 \cdot 5H_2O$<br>0.200 g $MgCl_2$<br>solid-state grinding | 1.248 g $Na_2S \cdot 9H_2O$<br>incipient wetness | A-B-C |
| ECS49 | CuS(3% Cu basis) + $MgCl_2$ | 10 g Bentonite | 1.299 g $CuSO_4 \cdot 5H_2O$<br>0.500 g $MgCl_2$<br>solid-state grinding | 1.248 g $Na_2S \cdot 9H_2O$<br>incipient wetness | A-B-C |
| ECS50 | CuS(3% Cu basis) + NaCl | 10 g Bentonite | 1.299 g $CuSO_4 \cdot 5H_2O$<br>0.100 g $NaCl_2$<br>solid-state grinding | 1.248 g $Na_2S \cdot 9H_2O$<br>incipient wetness | A-B-C |
| ECS51 | CuS(3% Cu basis) + NaCl | 10 g Bentonite | 1.299 g $CuSO_4 \cdot 5H_2O$<br>0.200 g $NaCl_2$<br>solid-state grinding | 1.248 g $Na_2S \cdot 9H_2O$<br>incipient wetness | A-B-C |
| ECS52 | CuS(3% Cu basis) + NaCl | 10 g Bentonite | 1.299 g $CuSO_4 \cdot 5H_2O$<br>0.500 g $NaCl_2$<br>solid-state grinding | 1.248 g $Na_2S \cdot 9H_2O$<br>incipient wetness | A-B-C |
| ECS53 | SnS (3.2% S basis) + $SnCl_2$ | 5 g metakaolin | 3.9 g $SnCl_2 \cdot 2H_2O$<br>solid-state grinding | 1.35 g $Na_2S \cdot 9H_2O$<br>incipient wetness | A-B-C |
| ECS54 | SnS (3.2% S basis) + $SnCl_2$ | 5 g metakaolin | 3.9 g $SnCl_2 \cdot 2H_2O$<br>solid-state grinding | 1.35 g $Na_2S \cdot 9H_2O$<br>solid-state grinding | A-B-C |
| ECS55 | $SnS_2$ (3.5% S basis) + $SnCl_4$ | 10 g metakaolin | 9.0 g $SnCl_4$<br>incipient wetness | 2.90 g $Na_2S \cdot 9H_2O$<br>solid-state grinding | A-C-B |
| ECS56 | $TiS_2$ (3.5% S basis) + $TiCl_4$ | 10 g metakaolin | 9.0 g $SnCl_4$<br>incipient wetness | 2.90 g $Na_2S \cdot 9H_2O$<br>solid-state grinding | A-C-B |
| ECS57 | $Fe_2S_3$ (10.0% S basis) | 10 g Na-bentonite | 6.24 g $FeCl_3 \cdot 6H_2O$<br>solid-state grinding | 8.33 g $Na_2S \cdot 9H_2O$<br>solid-state grinding | A-B-C |
| ECS58 | CuS (5.0% S basis) | 10 g bentonite | 4.33 g $CuSO_4 \cdot 5H_2O$<br>co-precipitation | 4.16 g $Na_2S \cdot 9H_2O$<br>co-precipitation | A-B-C |

TABLE 2

Source and purity of the raw chemicals

| Raw Chemical | Supplier or Source | Purity |
|---|---|---|
| $CuCl_2 \cdot 2H_2O$ | Alfa-Aesar | 99+% |
| $CuSO_4 \cdot 5H_2O$ | Alfa-Aesar | 98.0-102.0% |
| $Cu(Acetate)_2 \cdot H_2O$ | Aldrich | 98+% |
| $Cu(NO_3)_2 \cdot 5H_2O$ | Aldrich | 98% |
| $Na_2S \cdot 9H_2O$ | Alfa-Aesar | 98.0-103.0% |
| $FeCl_3 \cdot 6H_2O$ | Aldrich | 98+% |
| $MnCl_2 \cdot 4H_2O$ | Aldrich | 98+% |
| $MgCl_2$ | Alfa-Aesar | 99% |
| $KMnO_4$ | Alfa-Aesar | 99.0% |

TABLE 3

Source, Treatment and Properties of Substrates

| Substrate | Supplier or Source | Pre-treatment |
|---|---|---|
| Backyard dirt | Dirt from backyard<br>25 Middlesex/Essex Tpk<br>Iselin, NJ | dried and sieved to a particle size smaller than 200 mesh |
| Metakaolin | Engelhard | as-is |
| Kaolin | Engelhard | as-is |
| Bentonite | Black Hills Bentonite milled to a particle size of $D_{90} < 10$ μm | |

| | $N_2$ Surface Area ($m^2$/g) | $N_2$ Pore Volume (cc/g) | Pore Diameter (nm) |
|---|---|---|---|
| Backyard dirt | 21.0 | 0.10 | 21.1 |
| Metakaolin | 22.4 | 0.11 | 19.2 |
| Kaolin | 27.0 | 0.12 | 18.5 |
| Bentonite | 35.4 | 0.11 | 12.2 |

TABLE 3-continued

Source, Treatment and Properties of Substrates

Main Chemical Composition (%)

|  | $SiO_2$ | $Al_2O_3$ | $Fe_2O_3$ | $K_2O$ | MgO | $Na_2O$ | $TiO_2$ | CaO |
|---|---|---|---|---|---|---|---|---|
| Backyard dirt | 61.78 | 22.76 | 5.87 | 3.13 | 2.14 | 1.56 | 1.20 | 0.75 |
| Metakaolin | 48.12 | 47.94 | 0.87 | 0.25 | / | 0.09 | 2.15 | 0.23 |
| Kaolin | 50.45 | 47.32 | 0.32 | 0.12 | / | 0.10 | 0.98 | 0.15 |
| Bentonite | 67.50 | 20.20 | 3.20 | 0.51 | 2.06 | 2.64 | 0.23 | 2.42 |

|  | XRD Crystallinity | Structure |
|---|---|---|
| Backyard dirt | mixed phases | mixed structures |
| Metakeolin | amorphous | non-layered |
| Kaolin | crystalline | layered, interlay inaccessible |
| Bentonite | crystalline | layered. interlayer accessible |

The formation of metal sulfide (CuS) on the substrate particles is evidenced by the darkening of the paste and the heat release due to the following reaction:

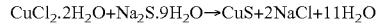

$$CuCl_2.2H_2O+Na_2S.9H_2O \rightarrow CuS+2NaCl+11H_2O$$

Spectroscopic data also supports this observation of CuS formation on the substrate. Infrared (IR) spectra of bentonite-supported chemical $CuCl_2$, $Na_2S$, CuS, NaCl, and three sorbents that were prepared from the solid-state grinding of $CuCl_2.2H_2O$, $Na_2S.9H_2O$ and bentonite, as described above, confirmed that the three sorbents (2.5, 5.0 and 10.0% S basis) contain dominantly CuS and NaCl and very little $CuCl_2$ and $Na_2S$ precursors. X-ray powder diffraction provided similar evidence of the formation of CuS. X-ray elemental microprobe also showed that the space distribution of Cu on the surface of substrate particles is identical to that of sulfur, indicating again the formation of CuS on the substrate surface.

Mercury Removal Evaluation

The Hg-removal performance of the sorbents described above was evaluated by an in-flight test, which is a commonly used fast screening method used to rank sorbents. The measurement includes the total mercury removal from simulated flue gas ($Hg]_{injection\ start}-[Hg]_{injection\ stop}/[Hg]_{injection\ start}*100\%$) and the kinetics, or rate, of the Hg-capture (–d (Hg %)/dt). Both parameters are important since the former measures the total Hg-capture while the latter is directly related to the strength of adsorption sites on the sorbent material. Thus, good sorption may be characterized by both high and fast Hg removal at fixed sorbent injection rate.

Mercury concentration at the outlet of the sorbent injection chamber was measured using an Ohio Lumex cold vapor atomic absorption instrument. The simulated flue gas consisted of 1600 ppm $SO_2$, 400 ppm NOx, 12% $CO_2$, 6% oxygen, 2% water, and balanced by nitrogen. The flow rate was 944 sccm, sorption pressure 12 psia, and sorption temperature 140.5° C.

Table 4 summarizes the in-flight test results of metal sulfide/substrate sorbents from Table 1. All of the sorbent samples were sieved through a 325 mesh sieve prior to the injection. In-flight test results were compared to samples made in accordance with the ion exchange methods disclosed in U.S. Pat. No. 6,719,828, which demonstrated a total Hg removal between 70 to 90% (injection rate 6-10 lb/MMacf).

The data in Table 4 shows that (1) the CuS/bentonite samples prepared by incipient wetness or solid-state reactive grinding has the same or better Hg-removal than sorbents made by ion exchange methods; (2) there is no particular requirement of porosity, purity, or ion exchange capacity of the substrate; and (3) any substrate, even common dirt, provide substantially the same or even better mercury removal when the same amount of a sulfide such as CuS is dispersed on the substrate.

TABLE 4

Selected In-Flight Test Results

| Sample # | Sorbent* | Injection Rate (lb/MMacf) | Hg removal (%) | Rate d(Hg %)/dt |
|---|---|---|---|---|
| ECS-01 | CuS/bentonite 10% Cu basis | 8.4 | 93 | 0.133 |
| ECS-02 | CuS/bentonite 10% Cu basis $CuSO_4$ precursor | 8.4 | 93 | 0.133 |
| ECS-03 | Cu/bentonite 20% Cu basis | 9.9 | 89 | 0.264 |
| ECS-04 | $Fe_2S_3$/bentonite 10% S basis | 7.4 | 17 | 0.044 |
| ECS-05 | CuS/metakaolin 10% Cu | 2.5 | 17 | 0.7 |
| ECS-06 | (CuS + $CuCl_2$)/bentonite 20% Cu basis; Cu:S = 2:1 | 8.2 | 62 | 0.067 |
| ECS-07 | (CuS + S)/bentonite 10% Cubasis; Cu:S = 1:2 | 9.0 | 90 | 0.406 |

TABLE 4-continued

Selected In-Flight Test Results

| Sample # | Sorbent* | Injection Rate (lb/MMacf) | Hg removal (%) | Rate d(Hg %)/dt |
|---|---|---|---|---|
| ECS-08 | MnS/bentonite 5% S basis | 5.9 | 73 | 0.030 |
| ECS-09 | Sulfur/bentonite 10% S basis | 5.5 | 32 | 2.5 |
| ECS-10 | bentonite As-is | 5.0 | 27 | 0.021 |
| ECS-11 | MnS$_2$/bentonite 10% S basis | 8.6 | 47 | 0.086 |
| ECS-12 | KMnO4/bentonite 6% Mn basis | 9.3 | 9 | 2.8 |
| ECS-14 | Cu/metakaolin 10% Cu basis | 9.0 | 78 | 0.356 |
| ECS-15 | CuS/bentonite 20% Cu basis dried at 150° C. | 11.6 | 90 | 68.3 |
| ECS-16 | CuS/metakaolin 20% Cu Basis | 7.0 | 89 | 54.2 |
| ECS-17 | CuS/metakaolin 15% Cu Basis | 7.4 | 93 | 57.5 |
| ECS-18 | CuS/kaolin 10% Cu Basis | 10.2 | 92 | 67.7 |
| ECS-19 | CuS/backyard dirt 10% Cu Basis | 11.7 | 93 | 69.0 |
| ECS-21 | CuS/bentonite 10% Cu Basis | 8.2 | 92 | 29.1 |
| ECS-22 | CuS/bentonite 4% Cu basis, | 6.2 | 93 | 43.0 |
| ECS-23 | CuS/bentonite 4% Cu basis, CuSO4 | 7.2 | 76 | 24.6 |
| ECS-24 | CuS/bentonite 7% Cu basis | 8.8 | 89 | 22.3 |
| ECS-25 | CuS/bentonite 7% Cu basis, CuSO4 | 7.3 | 62 | 22.0 |
| ECS-26 | CuS/bentonite 10% Cu basis (blender scale-up) | 5.7 | 94 | 30.8 |
| ECS-27 | CuS/bentonite 10% Cu + 1.0 g MgCl2 | 7.7 | 94 | 47.4 |
| ECS-28 | CuS/bentonite 10% Cu + 2.0 g MgCl2 | 10.3 | 94 | 20.5 |
| ECS-29 | CuS/bentonite 10% Cu + 5.0 g MgCl2 | 7.8 | 36 | 6.2 |
| ECS-30 | CuS/bentonite 10% Cu, CuSO4/CuCl2 = 1.5 | 7.5 | 93 | 47.4 |
| ECS-31 | CuS/bentonite 10% Cu, CuSO4/CuCl2 = 2.2 | 7.0 | 91 | 39.5 |
| ECS-32 | CuS/bentonite 10% Cu, Cu acetate | 9.9 | 31 | 28.5 |
| ECS-33 | CuS/bentonite 7% Cu, Cu acetate | 7.8 | 59 | 24.6 |
| ECS-34 | CuS/bentonite 4% Cu, Cu acetate | 11.5 | 23 | 18.9 |
| ECS-35 | CuS/bentonite 10% Cu, Cu nitrate | 4.5 | 58 | 24.0 |
| ECS-36 | CuS/bentonite 7% Cu, Cu nitrate | 6.3 | 54 | 14.6 |
| ECS-37 | CuS/bentonite 4% Cu, Cu nitrate | 5.3 | 55 | 19.6 |
| ECS-38 | CuS/bentonite 10% Cu, CuS | 3.2 | 19 | 10.0 |
| ECS-39 | CuS/bentonite 20% Cu, CuS | 3.6 | 32 | 14.1 |
| ECS-40 | CuS/bentonite 1% Cu, incipient wet | 6.1 | 93 | 31.9 |
| ECS-41 | CuS/bentonite 2% Cu, incipient wet | 6.0 | 93 | 31.0 |
| ECS-42 | CuS/bentonite 3% Cu, incipient wet | 7.0 | 98 | 28.0 |
| ECS-43 | CuS/bentonite 1% Cu, CuSO4, incipient wet | 5.9 | 36 | 12.3 |
| ECS-44 | CuS/bentonite 2% Cu, CuSO4, incipient wet | 6.9 | 31 | 12.0 |
| ECS-45 | CuS/bentonite 3% Cu, CuSO4, incipient wet | 75. | 40 | 118.4 |

TABLE 4-continued

Selected In-Flight Test Results

| Sample # | Sorbent* | Injection Rate (lb/MMacf) | Hg removal (%) | Rate d(Hg %)/dt |
|---|---|---|---|---|
| ECS-46 | CuS/bentonite 4% Cu, CuSO4 + 0.1 g MgCl2 | 7.3 | 87 | 27.9 |
| ECS-47 | CuS/bentonite 3% Cu, CuSO4 + 0.1 g MgCl2 | 7.7 | 83 | 31.1 |
| ECS-48 | CuS/bentonite 3% Cu, CuSO4 + 0.2 g MgCl2 | 7.5 | 80 | 33.5 |
| ECS-49 | CuS/bentonite 3% Cu, CuSO4 + 0.5 g MgCl2 | 6.2 | 81 | 27.1 |
| ECS-50 | CuS/bentonite 3% Cu, CuSO4 + 0.1 g NaCl | 6.4 | 87 | 30.5 |
| ECS-51 | CuS/bentonite 3% Cu, CuSO4 + 0.2 g NaCl | 6.7 | 83 | 27.4 |
| ECS-52 | CuS/bentonite 3% Cu, CuSO4 + 0.5 g NaCl | 5.6 | 89 | 18.1 |

(*unless stated otherwise, $CuCl_2 \cdot 2H_2O$ and $Na_2S \cdot 9H_2O$ precursors were used; )

Figure 2:
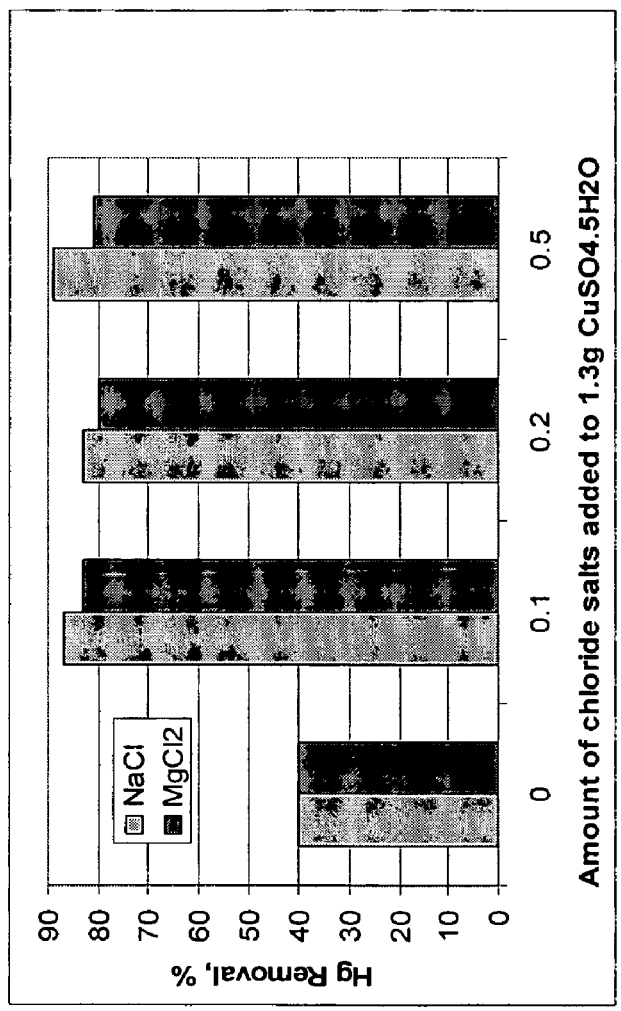
FIG. 2 is a graph showing the effect of the addition of chloride salts on mercury removal.

FIGS. 1 and 2 further demonstrate the optimized copper loading and importance of the presence of chloride anion in the sorbent. As shown in FIG. 1, at the Cu loading of 4 wt %, the Hg-removal seems to have reached the maximum level. Samples were prepared by the incipient wetness and solid state grinding techniques described using the bentonite substrate and the precursors noted in Table 1. The copper loading level was varied between 0 and 10% and the Hg-removal was measured as described above. Different metal precursors exhibited different Hg-removal efficiency. For the results shown in FIG. 1, only the sorbents made using a $CuCl_2$ precursor provided Hg-removal of above 80%. The highest Hg-removal was 98% at 3% Cu loading level, which is not shown in the Figures.

Adding a small amount of chloride, such as NaCl or $MgCl_2$, to copper sulfate significantly increases its Hg removal, shown in FIG. 2 where all sorbents have 3% Cu loading level on bentonite substrate loaded with copper sulfate precursors as described above and prepared by incipient wetness. FIG. 2 demonstrates that adding a small amount of chloride in the sorbents effectively enhances Hg-removal. This also has practical importance. For example, the use of pure chloride salt precursor can lead to corrosion of stainless steel reaction vessels. Therefore, the addition of mixed salts not only enhances mercury removal but reduces corrosion of equipment.

It will be apparent to those skilled in the art that various modifications and variations can be made to the present invention without departing from the spirit or scope of the invention. For example, while the sorbents disclosed herein are particularly useful for removal of mercury from the flue gas of coal-fired boilers, the sorbents can be used to remove heavy metals such as mercury from other gas streams, including the flue gas of municipal waste combustors, medical waste incinerators, and other Hg-emission sources. Thus, it is intended that the present invention cover modifications and variations of this invention provided they come within the scope of the appended claims and their equivalents.

What is claimed is:

1. A method of making sorbent particles for the removal of mercury and other pollutants from a gaseous stream comprising:

mixing a solid metal salt with sorbent substrate particles having an outer surface;

mixing a sulfide salt with the sorbent substrate particles by grinding, milling or incipient wetness to form a metal sulfide on the outer surface of the particles; and drying the particles having a metal sulfide on the outer surface.

2. The method of claim 1, wherein the substrate particles are selected from the group consisting of alumina, silica, titania, zirconia, iron oxides, zinc oxide, rare earth oxides, metal carbonate, metal sulfate, aluminosilicates, zeolites, activated carbon, kaolin, metakaolin, fully calcined kaolin, talc, coal particles, dirt, and combinations thereof.

3. The method of claim 1, wherein no waste salts or solutions are generated from the method.

4. The method of claim 1, wherein the metal salts are salts selected from the group consisting of alkaline, alkaline earth metals and metals having an atomic number between 21 and 30, between 38 and 50 and between 56 and 79, and combinations thereof.

5. The method of claim 4, wherein the metal salt includes a metal selected from the group consisting of copper, titanium, tin, iron, manganese and combinations thereof.

6. The method of claim 4, wherein the metal salt is selected from the group consisting of nitrate, chloride, sulfate and acetate salts, and combinations thereof.

7. The method of claim 4, wherein the loading level of the metal salt is between about 1 and 20 weight percent.

8. The method of claim 1, wherein the sulfide salt is a sulfide precursor that forms the $S^{-2}$ anion.

9. The method of claim 8, wherein the sulfide salt is selected from the group consisting of $Na_2S$ and $(NH_4)_2S$.

10. The method of claim 4, wherein the metal salt is a chloride or a mixture of chloride and another salt.

11. The method of claim 1, further comprising reducing the sorbent particle size to an average particle size of less than about 80 μm.

12. The method of claim 1, wherein the drying occurs at a temperature of between about 90° and 140° C.

13. The method of claim 1, wherein the metal sulfide is selected from the group consisting of copper sulfides, tin sulfides, manganese sulfides, titanium sulfides, iron sulfides and combinations thereof.

14. The method of claim 1, wherein the method does not utilize ion exchange to form the metal sulfide on the surface of the particles.

15. A sorbent made by the method of claim 1, the sorbent being effective to remove mercury from a flue gas stream.

16. A method of removing mercury and other pollutants from a flue gas stream comprising injecting a sorbent made by the method of claim 1 into a coal-fired boiler flue gas stream.

17. A sorbent comprising substrate particles containing a metal sulfide formed on the outer surface of the substrate particles by grinding, milling or incipient wetness, the metal sulfide selected from the group consisting of copper sulfide, tin sulfide, manganese sulfide, titanium sulfide, iron sulfide and combinations thereof the sorbent being effective for removal of mercury and other pollutants from a gas stream.

18. The sorbent of claim 17, wherein the substrate particles are selected from the group consisting of alumina, silica, titania, zirconia, iron oxides, zinc oxide, rare earth oxides, metal carbonate, metal sulfate, aluminosilicates, zeolites, activated carbon, kaolin, metakaolin, fully calcined kaolin, montmorillonite, talc, coal particles, dirt, and combinations thereof.

19. The method of claim 1, wherein the metal salt is mixed with the substrate particles followed by mixing the sulfide salt with the substrate particles and the metal salt.

20. The method of claim 1, wherein the sulfide salt is mixed with the substrate particles followed by mixing the metal salt with the substrate particles and the sulfide salt.

* * * * *